(12) United States Patent
Wilson (10) Patent No.: US 7,211,770 B2
(45) Date of Patent: May 1, 2007

(54) DEEP FRYING APPLIANCE

(76) Inventor: Ian Geoffrey Wilson, 40 Cobran Road, Cheltenham, NSW, 2060 (AU)

( * ) Notice: Subject to any disclaimer, the term of this patent is extended or adjusted under 35 U.S.C. 154(b) by 0 days.

(21) Appl. No.: 10/533,364

(22) PCT Filed: Oct. 31, 2003

(86) PCT No.: PCT/AU03/01431

§ 371 (c)(1),
(2), (4) Date: Nov. 21, 2005

(87) PCT Pub. No.: WO2004/039229

PCT Pub. Date: May 13, 2004

(65) Prior Publication Data

US 2006/0151464 A1    Jul. 13, 2006

(30) Foreign Application Priority Data

Oct. 31, 2002    (AU)    ............................... 2002952394

(51) Int. Cl.
*A47J 36/12*    (2006.01)

(52) U.S. Cl. .................. 219/439; 219/437; 99/403; 99/408

(58) Field of Classification Search .............. 219/437; 392/448
See application file for complete search history.

(56) References Cited

U.S. PATENT DOCUMENTS

| | | | | |
|---|---|---|---|---|
| 887,923 A | * | 5/1908 | Crandall | ...................... 219/437 |
| 1,117,277 A | * | 11/1914 | Supplee | ...................... 392/448 |
| 1,429,898 A | * | 9/1922 | Macy | ...................... 219/437 |
| 2,711,474 A | * | 6/1955 | Krichton | ...................... 392/448 |
| 3,737,621 A | * | 6/1973 | Elkins | ...................... 392/448 |
| 6,941,857 B2 | * | 9/2005 | McLemore | ...................... 99/403 |
| 7,098,427 B2 | * | 8/2006 | Ducarme et al. | ............. 99/403 |

FOREIGN PATENT DOCUMENTS

| | | | |
|---|---|---|---|
| DE | 3600294 | | 7/1987 |
| DE | 19907172 | | 8/2000 |
| DE | 20207570 | | 10/2002 |
| EP | 546208 | | 6/1993 |
| EP | 1025788 | | 8/2000 |
| EP | 1029488 | | 8/2000 |
| EP | 1228731 | | 8/2002 |
| JP | 08224176 | | 9/1996 |
| JP | 08224176 A | * | 9/1996 |
| JP | 11235281 | | 8/1999 |
| JP | 2002 125864 | | 8/2002 |

* cited by examiner

*Primary Examiner*—Joseph Pelham
(74) *Attorney, Agent, or Firm*—Knobbe, Martens, Olson & Bear, LLP (57) ABSTRACT

An electric deep frying appliance adapted for the heating of cooking oil comprising a bowl and heating assembly; said heating assembly including a heat distributor wherein said heat distributor is in the form of an annular dished member; said heating assembly further including a control pylon adapted to provide power and temperature control to said heat distributor.

20 Claims, 7 Drawing Sheets

DEEP FRYING APPLIANCE

RELATED APPLICATIONS

This application is the U.S. National Phase of PCT/AU03/001431 filed Oct. 31, 2003 and claims priority to Australian Patent Application No. 2002952394 filed Oct. 31, 2002, which are hereby incorporated herein by reference in their entirety.

The present invention relates to equipment for the deep frying of food, and more particularly to electric deep frying appliances for domestic or small commercial use.

BACKGROUND

The deep frying of foods in oil such as for example fish and chips has long been practiced on a commercial basis. The equipment used is generally in the form of large volume stainless steel tanks, frequently gas fired. Commonly the heating source or sources are so arranged as to maximize the useful life of the large volumes of expensive cooking oil by minimizing the harmful carbonizing of the oil. Such carbonizing is caused by high concentrations of heat per unit area at the heating source.

It is usual also in such commercial systems to incorporated a cool area at the base of the tank which allows any carbonized particles which may form to collect in this cool area and thus be isolated from further heating. This is an important consideration in the design of deep frying equipment since some studies have linked carbonized heating oil to detrimental health effects.

In recent years the market has seen the development of a range of electric deep frying appliances, primarily intended for domestic use. They generally fall into two categories: bowls with separate heating elements depending into the bowl and bowls with fixed external heating elements. Both categories suffer from a number of disadvantages.

In the interest of cleaning, the elements and electrical control unit of deep fryers in the first category, are generally removable as a unit. The heating elements of these units generally employ a tubular heating coil bent into some suitable pattern to distribute heat to the oil in which the element is immersed. Because the length of such tubular coils is limited by practical restrictions inherent in their manufacture, the resulting ratio of heat energy emitted per unit area to achieve a required deep frying temperature is very high; sufficiently high to induce carbonizing.

Another difficulty in this first category of deep frying appliances is the positioning of the thermostat thermocouple. It is necessary to control not only the cooking oil temperature prior to the addition of cold food, but also to quickly sense the temperature reduction as a result of the addition of such food. If the temperature controlling device does not sense a reduction in oil temperature quickly enough and re-energises the heating element, the food will absorb excessive amounts of oil. To compensate for this lag in thermal response, many deep fryers have higher than desirable initial oil temperature settings, which results in the inevitable rapid degradation of the oil.

Additionally, because of the danger of igniting cooking oil, regulatory authorities subject deep fryers to rigorous testing. It is a requirement of sale, for example, that if a deep fryer is turned on with either no oil, or only a remaining oil residue after emptying, that no fire will be ignited. The thermocouple must react both to the oil when present, and the heating element when no oil is present.

A known solution has been to attach the thermocouples and their connection tubes to the coils but this renders them vulnerable and makes cleaning difficult.

In deep frying appliances of the second category, the heating element is often attached to the underside of the bowl. This inevitably leads to considerable inefficiency as only a proportion of the heat emitted by the element can be transferred to the oil inside the bowl. Again the configuration of the heating element is generally that of a single coil so that the heat induced per unit of surface area of the bowl is likely to be considerably higher than desirable. This second category of fryers has traditionally used thermostats attached to the outside of the heating bowl. As a result, it is difficult for these to quickly sense a drop in internal oil temperature, and thus cooking performance suffers.

Additionally, carbonised materials gravitate to the hottest part of the container and degrade the oil rapidly It is an object of the present invention to address or ameliorate at least some of the above disadvantages.

BRIEF DESCRIPTION OF INVENTION

Accordingly, in one broad form of the invention there is provided an electric deep frying appliance adapted for the heating of cooking oil comprising a bowl and heating assembly; said heating assembly including a heat distributor wherein said heat distributor is in the form of an annular dished member; said heating assembly further including a control pylon adapted to provide power and temperature control to said heat distributor.

Preferably said bowl is formed of a substantially vertical wall part and a dished base part.

Preferably said bowl is formed of mild steel.

Preferably said bowl is formed of stainless steel.

Preferably said bowl is formed of aluminium.

Preferably said bowl is supported in a suitable support structure.

Preferably said dished base part is provided with a central depression, said central depression adapted to the accumulation of oil contaminants.

Preferably said annular dished member extends substantially between the perimeter of said central depression and the internal surface of said wall part.

Preferably said heating assembly is removable from said bowl.

Preferably said annular dished member contains a heat emitting tubular element.

Preferably said annular dished member is formed of pressure die-cast aluminium, said die cast aluminium enveloping said tubular element.

Preferably said tubular element is in the form of a steel tube having an insulated heating coil spring along the axis of said tube; said coil spring connected to terminals at the outer ends of said spring.

Preferably said annular dished member is provided with an integrally die-cast raised pylon connector spigot.

Preferably said annular dished member is provided with integrally cast support members projecting from the underside of said dished member so as to raise said dished member above the surface of said dished base part of said bowl.

Preferably said terminals of said coil spring project upwardly in said connector spigot.

Preferably said control pylon includes a vertical tubular member and a control module, said control module sealably connected to the upper end of said tubular member.

Preferably said raised pylon connector spigot is sealably connected to the lower end of said tubular member.

Preferably said tubular member is of a length sufficient to position said control module above the rim of said bowl when said annular dished member of said heat distributor is resting with said support members on said dished base part of said bowl.

Preferably said heating assembly includes a thermostat and power connection module, said module adapted to mount to said connector spigot within said vertical tubular member.

Preferably said thermostat and power connection module includes an adjustable thermostat mechanism, said mechanism provided with a vertically projecting adjustment shaft.

Preferably said thermostat and power connection module includes connector means adapted to provide electrical connection with said terminals of said heating coil spring when said thermostat and power connection module is located on said connector spigot.

Preferably said control module is provided with a safety switch projecting from said module such that said switch is in a first "power enabled" position when said heating assembly is properly installed in said bowl.

Preferably said safety switch is in a second "power disabled" position when said heating assembly is removed from said bowl.

Preferably power conductors extending the length of said tubular member are connected between said connector means and said safety switch.

Preferably said control module is provided with a main power switch adapted to provide mains power to said safety switch.

Preferably said control module is provided with a thermostat control knob, said control knob connected to said thermostat adjustment shaft by a connector rod.

Preferably said thermostat control knob and said adjustment shaft are adapted to the setting of said thermostat module to transfer power to said heating element up to a desired temperature of cooking oil within a predetermined range of temperatures.

Preferably said thermostat control knob and said adjustment shaft are adapted to the re-setting of said thermostat module.

Preferably said control module is provided with a power socket adapted to receive a power input plug.

Preferably the electrical characteristics of said heat emitting tubular element and the surface area of said annular dished member are adapted to have a maximum heat flux density of less than 5 watts per centimeter squared.

Preferably a sludge strain basket is provided; said basket adapted to restrict turbulent flow of oil proximate to said dished part of said bowl; said basket adapted to capture particulate carbon.

In a further broad form of the invention there is provided an electric deep frying appliance adapted for the heating of cooking oil comprising a bowl and heating assembly; said heating assembly including a heat distributor wherein said heat distributor is in the form of a tubular heating element; said heating assembly further including a control pylon adapted to provide power and temperature control to said heat distributor.

Preferably said bowl is formed of a substantially vertical wall part and a dished base part.

Preferably said bowl is formed of mild steel.

Preferably said bowl is formed of stainless steel.

Preferably said bowl is formed of aluminium.

Preferably said bowl is supported in a suitable support structure.

Preferably said heat distributor is in the form of a tubular heating element; said tubular heating element arranged in a symmetrical pattern projecting generally in a horizontal plane from the lower end of said control pylon; said pattern adapted to an even distribution of heat emanating from said tubular heating element.

Preferably said tubular heating element is comprised of a steel tube having an insulated heating coil spring along the axis of said tube; said coil spring connected to terminals at the outer ends of said spring.

Preferably said control pylon includes a vertical tubular member and a control module, said control module sealably connected to the upper end of said tubular member.

Preferably said control pylon is provided with an end cap sealably connected to the lower end of said control pylon.

Preferably said heating assembly includes a thermostat and power connection module, said module adapted to mount within said end cap.

Preferably said thermostat and power connection module includes an adjustable thermostat mechanism, said mechanism provided with a vertically projecting adjustment shaft.

Preferably said thermostat and power connection module includes connector means adapted to provide electrical connection with said terminals of said heating coil spring when said thermostat and power connection module is located on said connector spigot.

Preferably said control module is provided with a safety switch adapted to prevent transmission of power to said heating coil spring when said heating assembly is improperly installed in said bowl.

Preferably said safety switch is adapted to prevent transmission of power to said heating coil spring when said heating assembly is not installed in said bowl.

Preferably a first thermostat and a second thermostat are in thermal communication with said end cap.

Preferably said end cap is in thermal communication by bridging means with a portion of said tubular heating element; said portion being thermally remote from said end cap.

Preferably said first thermostat is adapted to cut power to said heating element at a predetermined temperature; said temperature being a desired temperature of said cooking oil.

Preferably said second thermostat is adapted to cut power to said heating element at a temperature significantly higher than any desired temperature of said cooking oil.

In yet a further broad form of the invention there is provided an electric deep frying apparatus adapted for the heating of cooking oil comprising a bowl and a heat source; said heat source supplied by power cables conducted through a sealed control pylon extending between said heat source and the bowl entry.

Preferably said heat source comprises a heating element in heat conducting communication with a heat distributor.

Preferably said heat distributor is in the form of a dish having a central aperture.

Preferably said control pylon defines an oil-free volume.

Preferably a temperature control device is located at the base of said control pylon.

Preferably said temperature control device includes a bi-metallic strip; at least a portion of said strip being in thermal communication with said heat distributor.

Preferably said temperature control device is adjustable; an adjustment shaft passing from said temperature control device through said control pylon to a control module.

Preferably a sludge strain basket is provided; said basket adapted to restrict turbulent flow of oil blow said central aperture of said heat distributor; said basket adapted to capture particulate carbon.

In yet a further broad form of the invention there is provided an electric deep frying apparatus adapted for the heating of cooking oil comprising a bowl and a heat source; said heat source supplied by power conductor cables passing through a sealed vertical control pylon extending between said heat source and the bowl entry.

Preferably said heat source is in the form of a heating coil, said coil suspended spaced away from the base of said bowl by said control pylon.

Preferably said heating coil is provided with terminals issuing from an end cap sealably connected to the base of said pylon.

Preferably said end cap is provided with a heat conducting bridge in thermal communication with a portion of said heating coil.

Preferably dual self resetting thermostat units are mounted in the base of said control pylon; said thermostat units in thermal communication with said end cap and said heat conducting bridge.

Preferably a first of said thermostat units is adapted to prevent the supply of electrical power to said heating coil above a predetermined temperature of the cooking oil as thermally communicated to said casting; said predetermined temperature being associated with an optimum temperature for deep frying.

Preferably a second of said thermostat units is adapted to act as a safety power cut-off means, acting to prevent supply of electrical power to said heating coil at a temperature significantly higher than said predetermined temperature as thermally communicated through said heat conducting bridge.

In yet a further broad form of the invention there is provided a method for the heating of cooking oil in a bowl by means of a heat distributor wherein the maximum heat flux density of said heat distributor is not greater than 5 watts per centimeter squared; said method including the steps of:

(a) Providing a heat distributor in the form of a die cast dish having a central aperture,
(b) positioning said heat distributor in a bowl having a dished base and central depression,
(c) supporting said heat source clear of said dished base.

Preferably said die cast dish envelops a tubular heating element in heat conducting communication with said heat distributor.

Preferably said die cast dish extends substantially between the internal confines of said bowl and the periphery of said central depression.

Preferably said tubular heating element is supplied with electrical power via a control pylon sealably attached to a portion of said die cast dish.

Preferably said control pylon extends vertically to at least the rim of said bowl; the upper end of said pylon sealably attached to a power control module.

Preferably a temperature control module in the form of a thermostat is positioned at the base of said control pylon and in thermal communication with said die cast dish.

Preferably said temperature control module is adjustable by means of a control rod extending up through said control pylon from said temperature control module to a control knob mounted to said power control module.

Preferably the surface area of said die cast dish and the electrical characteristics of said tubular heating element are adapted to emit no greater than said maximum heat flux density of 5 watts per centimeter squared.

BRIEF DESCRIPTION OF THE DRAWINGS

Embodiments of the present invention will now be described with reference to the accompanying drawings wherein.

DETAILED DESCRIPTION OF PREFERRED EMBODIMENTS

Figure 1:
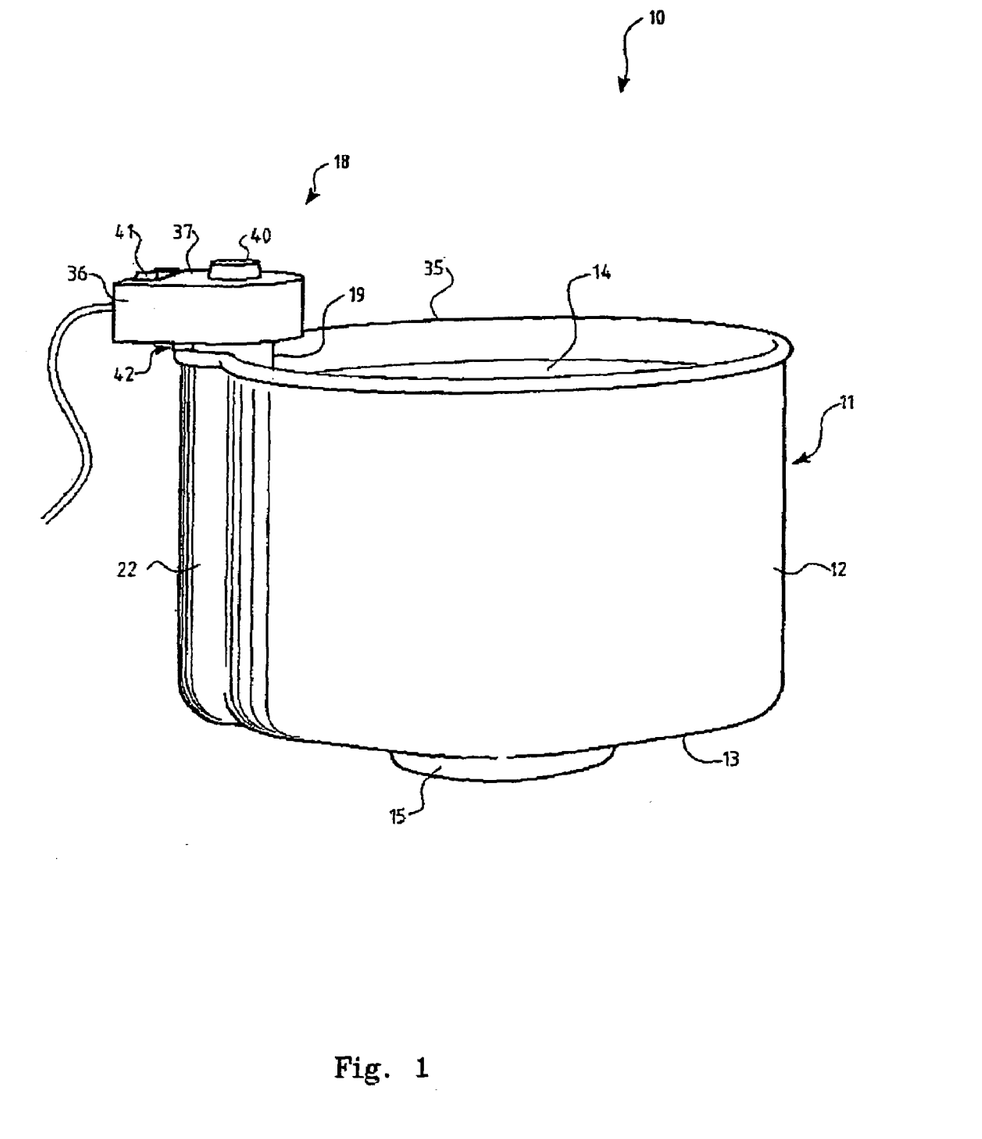
FIG. 1 is a perspective view of an assembled deep frying appliance according to the invention.

A first preferred embodiment of an electric deep frying appliance 10 according to the present invention will now be described with reference to FIG. 1. A bowl 11 having generally vertical walls 12 and a dished base part 13 is adapted to hold a quantity of cooking oil 14 and is mounted in a support structure (not shown). The support structure may be a simple stand or an enveloping shell of, for example, a suitable injection moulded polymer so as to provide both support and prevent contact with the outside of the bowl 11 when this is hot.

The bowl 11 may be formed of any suitable material including mild steel, stainless steel or aluminium. The base 13 of bowl 11 is provided with a central depression 15. Optionally, the bowl may be provided with a lid (not shown) which may be loose or hinged to the bowl 11 or to an enveloping shell. Bowl 11 may be of circular or oblong or any other suitable shape.

Figure 2:
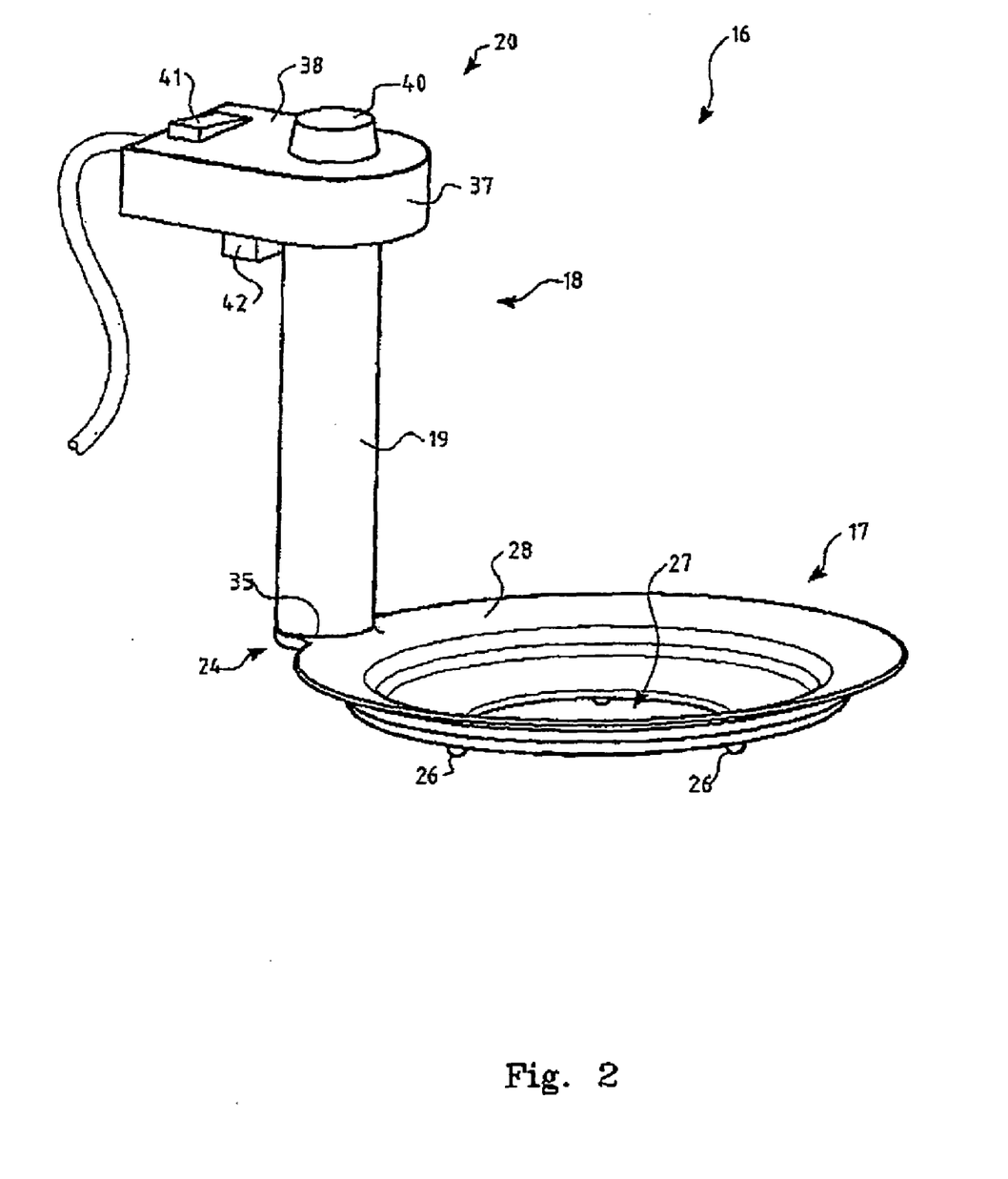
FIG. 2 is a perspective view of a heating assembly of the appliance of FIG. 1.
Figure 3:
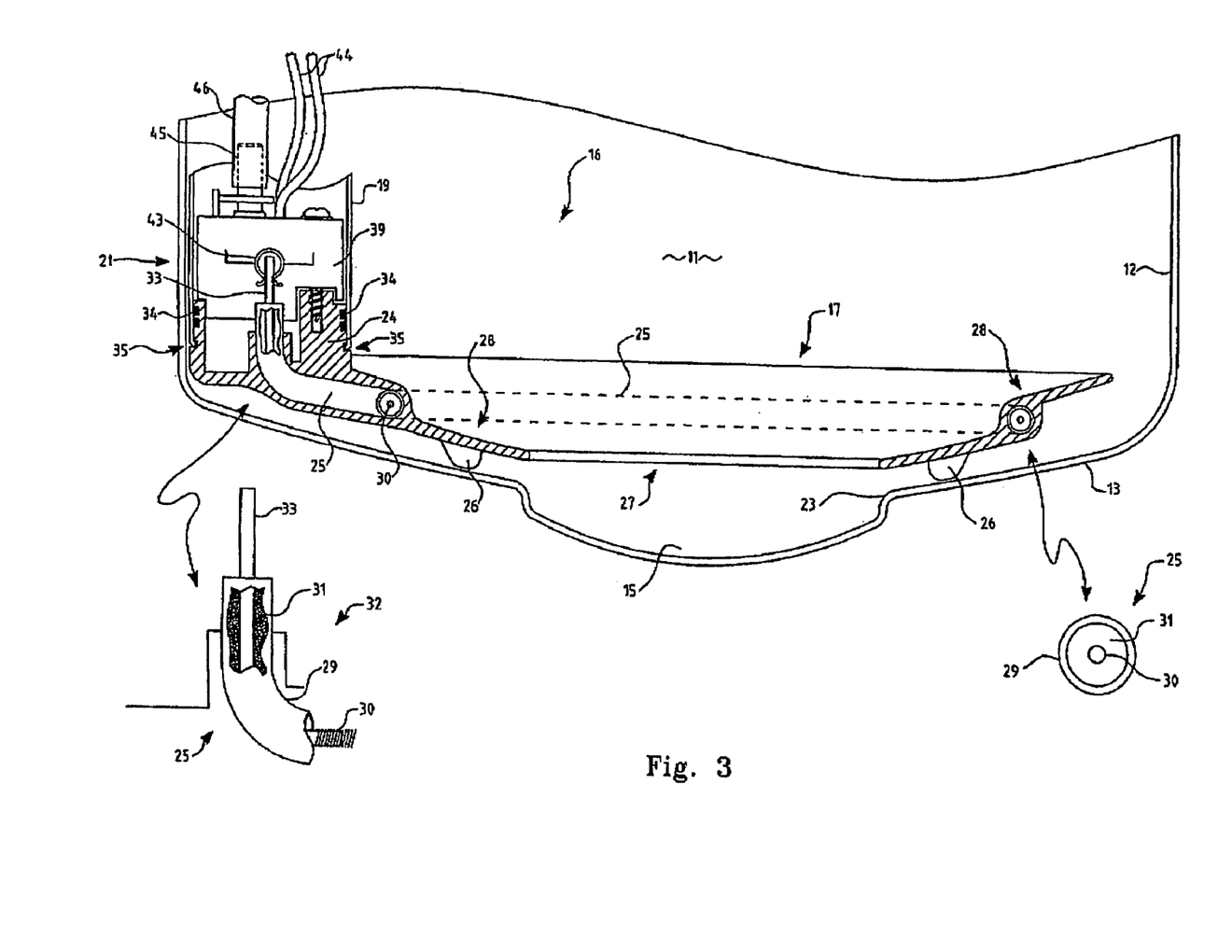
FIG. 3 is a sectioned view of a lower portion of the deep frying appliance of FIG. 1.

With reference to FIGS. 2 and 3, a heating assembly 16 is comprised of a heat distributor 17 and a control pylon 18. Control pylon 18 is further comprised of pylon tube 19 and control module 20. In a preferred embodiment bowl 11 is provided with a protruding vertical channel 22 as shown in FIG. 1, adapted to at least partially accommodate control pylon 18 so as to minimize its intrusion into the cooking area of bowl 11.

Figure 4:
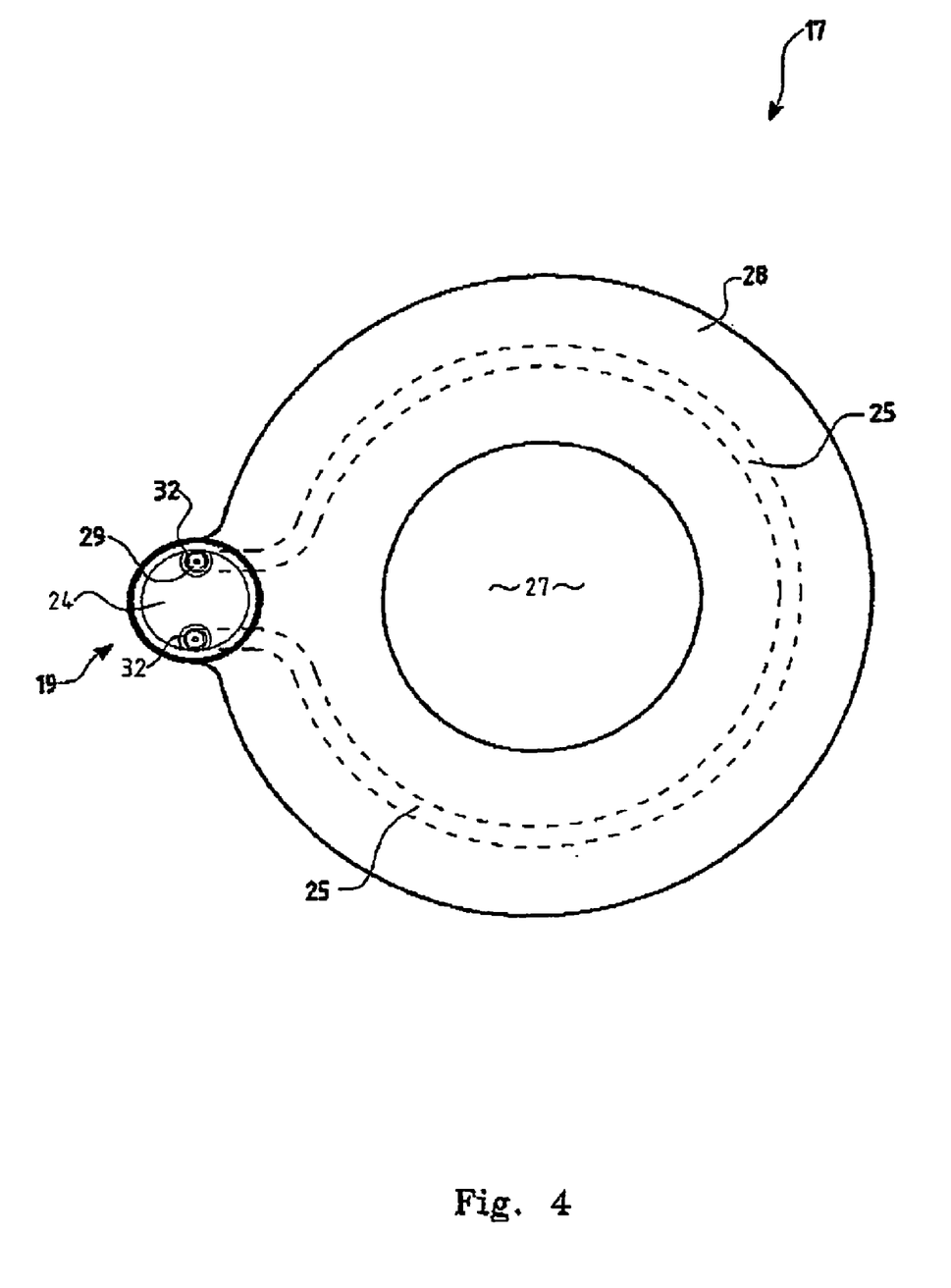
FIG. 4 is a plan view of a part of the heating assembly of FIG. 2.

Heat distributor 17 has an annular dished form extending between the periphery 23 of central depression 15 and vertical walls 12 as may best be seen in FIG. 3. Heat distributor 17 is provided with a circular shaped pylon connector spigot 24 projecting upwardly at a point on its periphery. The plate 17 and spigot 24 form a single unit of, for example, pressure die-cast aluminium construction. Heat distributor 17 is cast around a tubular heating element 25 shown in dashed outline in FIGS. 3 and 4.

Preferably the heat distributor 17 casting includes at least three projections from its underside in the form of supporting pillars 26 so as to position the heat distributor at some distance above the base 13 of the bowl 11. Plate 17 is provided with a central aperture 27 adapted to allow cooler oil and any contaminants such as food particles to sink to the central depression 15 of bowl 11. The dished shape of sides 28 of heat distributor 17 allows for a greater surface contact area as well as aiding in the directing of particulate matter towards the aperture 27 and central depression 15.

With reference to FIG. 3, tubular heating element 25 is of conventional construction, comprising an outer steel tube 29 containing a heating coil spring 30 and an insulating material 31. As can best be seen in FIG. 4, tubular heating element 25 forms an almost closed loop within heat distributor 17 with the ends 32 of the element bending upwardly to emerge from the casting at raised pylon connector spigot 24. Again with reference to FIG. 3, terminal rods 33 connected to the two ends of the heating coil spring 30, project from the tubular heating element ends 32 to provide connections for power input to the heating coil spring 30.

The control pylon tube 19 is a metal tube having a circular section adapted to attach to pylon connector spigot 24 of heat distributor 17. Sealing between control pylon tube 19 and pylon connector spigot 24 may be effected for example, by means of at least one "o" ring seal 34 together with a crimping of the edge 35 of the pylon tube 19 into a suitably formed recess as illustrated in FIG. 3. Alternatively, pylon tube 19 may be affixed to the connector spigot 24 by means of welding or brazing.

Control module 20 is fitted to the upper end of control pylon tube 19. The length of pylon tube 19 is such that control module 20 locates just above the rim 36 of bowl 11 when heating assembly 16 is placed in the bowl (refer FIG. 1). Control module 20 is comprised of an enclosure having a base portion 37 sealably attached to pylon tube 19 and a closure portion 38. When assembled to form heating assembly 16, control module 20, pylon tube 19 and heat distributor 17 form a sealed unit.

Control module 20 is provided with a temperature selector knob 40 a power switch 41 and a power safety switch 42. Power safety switch 42 projects from the bottom of base portion 37 of control module 20 so as to contact the rim 36 of bowl 11 or the bowl support structure. When heating assembly 16 is properly installed in bowl 11, safety switch 42 is caused to assume a "power on" position. When heating assembly 16 is removed from bowl 11 or not correctly positioned in it, safety switch 42 assumes its default position of "power off".

Prior to the assembly of closure portion 38 to base portion 37, thermostat module 21 is installed in the base of pylon tube 19. Thermostat module 21 is comprised of a housing 39 containing a thermostat mechanism (not shown) and spring clip power connector means 43 which project from housing 39. Housing 39 is adapted to slide into pylon tube 19 and seat against control pylon connector spigot 24. When fixed in this position, power connector means 43 are engaged to the terminal rods 33 of heating coil spring 30.

Power connector means 43 are provided with power via the thermostat mechanism (not shown) located in housing 39. The thermostat mechanism is in turn connected by power conductor cables 44 to safety switch 42. Safety switch 42 is in turn connected by conductor means to power switch 41.

The thermostat mechanism is provided with adjustment shaft 45 projecting upwardly from housing 39 and is connected to temperature selector knob 40 by means of connector rod 46. Preferably, the thermostat mechanism comprises a bi-metallic strip at least a portion of which is in thermal communication with the pylon connector spigot.

The surface area of heat distributor 17 and the electrical characteristics of tubular heating element 25 are adapted to the size and oil volume of a given bowl to provide a heat source having a heat flux density of no greater than approximately 5 watts per square centimeter. It has been found that heat fluxes higher than this can cause carbonization of cooking oils with a concomitant reduction in oil life and adverse health indications.

This relatively low power level is sufficient to limit the maximum heat distributor temperature to a level relatively close to that of the optimum cooking temperature of the oil. In addition to avoiding carbonizing, the large surface area of the heat distributor when compared with prior art heat sources, decreases the degree of the sudden drop in oil temperature when cold food is introduced into the bowl. This is aided by the locating of the thermostat module in close proximity to the heat distributor. Thus the efficiency of the cooking process in both time and energy expenditure is improved.

In a second preferred embodiment, the heat distributor is a casting which has the loop of the tubular steel heating element attached to its underside, for example by brazing. The ends of the heating element then pass upwardly through the base of the pylon connector spigot to emerge in the base of the communication pylon for attachment to the thermostat control module as described above.

In yet a further preferred embodiment, the heat distributor is comprised of concentric and dished rings of flattened heating elements issuing from the communication pylon spigot. The thermostat module is in thermal contact with the spigot so as to maximize the sensitivity of the thermostat to changes in the oil temperature.

Figure 5:
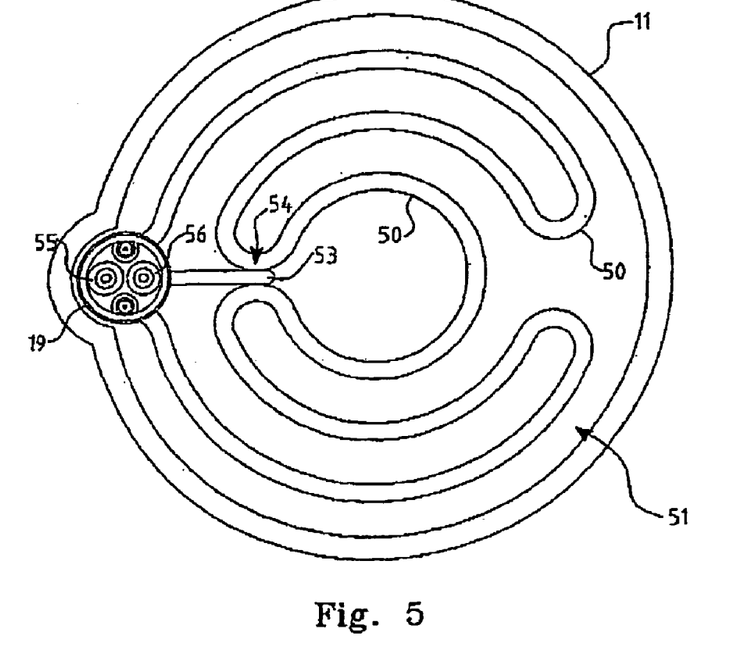
FIG. 5 is a plan view of a further embodiment of the invention.
Figure 6:
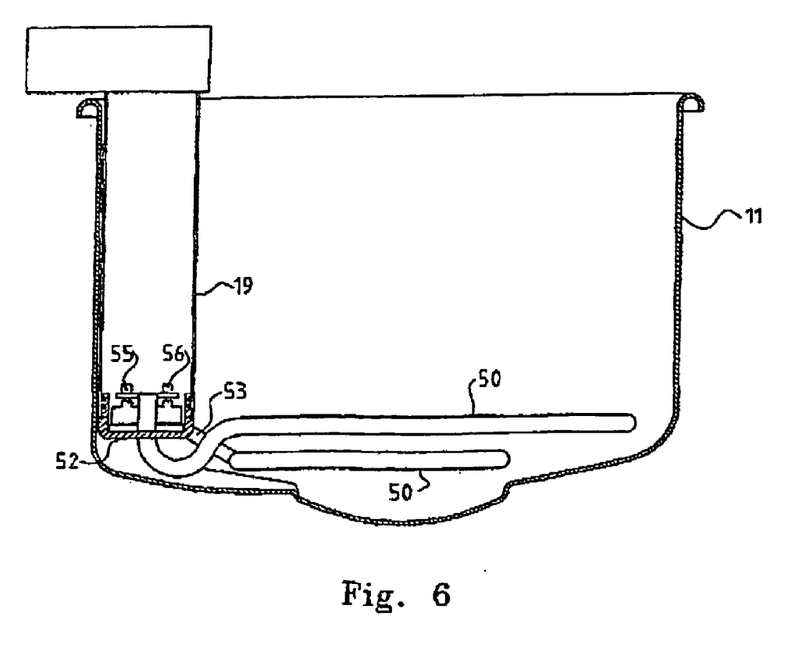
FIG. 6 is a sectioned view of the embodiment of FIG. 5.

In yet a further preferred embodiment as shown in FIGS. 5 and 6, the heat distributor 17 is in the form of a heating element tube 50 bent into a suitable heat distributing pattern 51 and issuing from an end cap 52 at the base of communication pylon 18. In this embodiment the end cap 52 at the base of the pylon 18 is formed either as a casting or a metal pressing sealably connected to the end of pylon tube 19.

A thermal bridge 53 is attached to the base of the end cap 52 and at a point 54 on the heating element tube 50 of the heat distributor, preferably at a point thermally remote from end cap 54 along the length of the tube 50. The bridge 53 serves to transfer heat to the end cap 52 at the base of the pylon in the event that the heating element has been switched on with no, or insufficient oil in the bowl 11.

Dual self re-setting thermostat units 55 and 56 are located in the end cap 52 of the pylon tube 19 and arranged so as to be in thermal communication with the end cap. The first of these thermostat units is set to cut power to the heating element when the heat transfer from heated oil around the end cap reaches a predetermined temperature. The second thermostat unit responds to cut power at a significantly higher temperature, acting as a safety back-up to the first.

Figure 7:
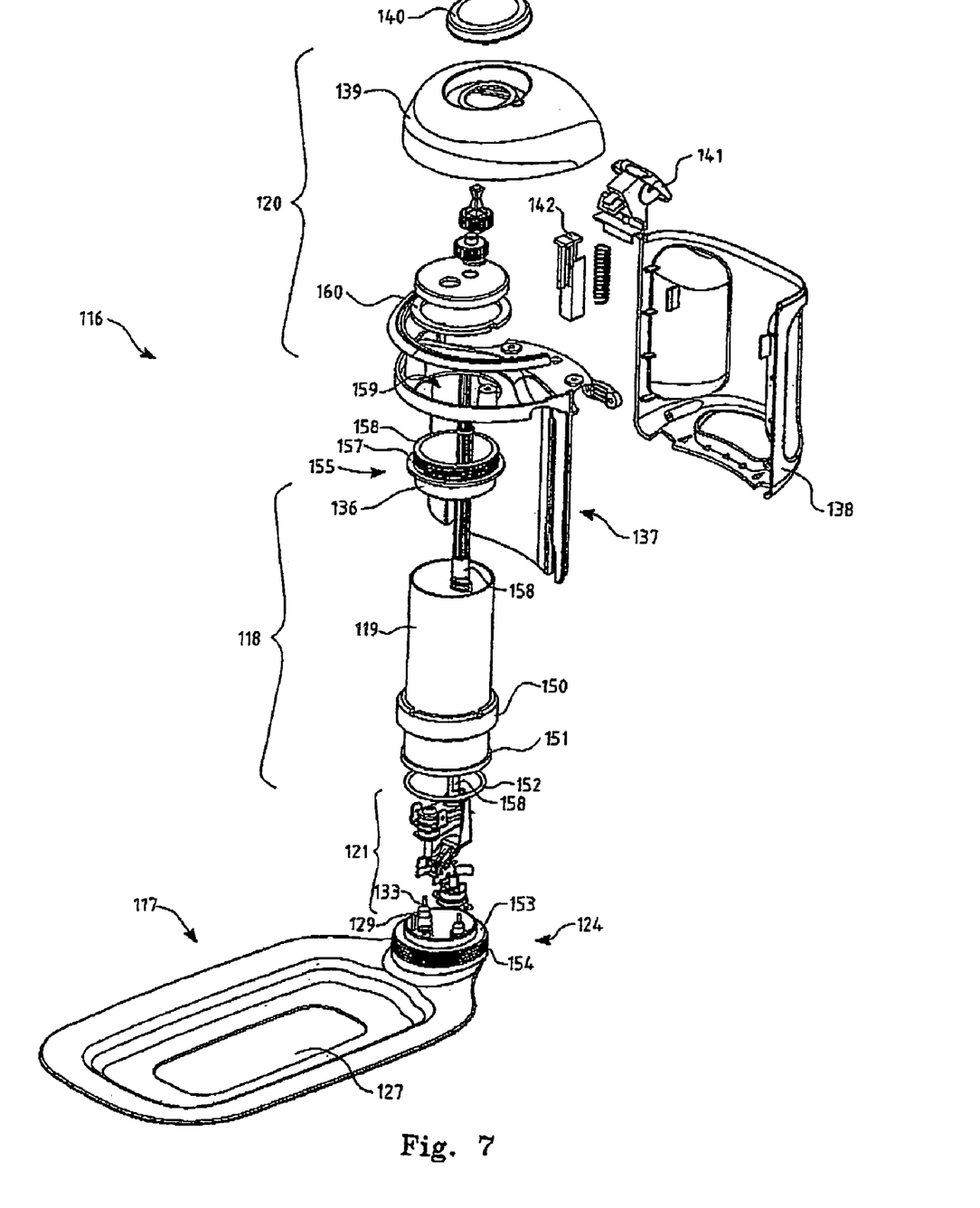
FIG. 7 is a perspective exploded view of a further preferred embodiment of the invention.

A further preferred embodiment of a heating assembly according to the invention is described with reference to the exploded views of FIG. 7 and the sectioned side view of FIG. 8 wherein like features are numbered as before but with the addition of 100. Heating assembly 116 again includes heat distributor 117 interconnected with control module 120 by control pylon 118.

Heat distributor 117 is provided with pylon connector spigot 124 which in this embodiment is provided with annular seating portion 153 and external thread 154. Pylon tube 119 is provided with projecting annular flange 151 and internally threaded ring 150 free to slide downwardly around the outer surface of pylon tube 119 until arrested by flange 151. The underside of flange 151 is a flat surface as is annular seating portion 153; each surface being normal to the axes of pylon tube 119 and connector spigot 124 respectively. Both surfaces are defined by similar outer and inner diameters. An "O" ring 152 is provided of a diameter to be supported on annular seating portion 153.

On assembly "O" ring 152 is placed on annular seating portion 153, pylon tube flange 151 is seated on the "O" ring and the internally threaded ring 150 screwed down onto threaded portion 154 thereby compressing "O" ring 152 between the opposing surfaces of the annular seating portion 153 and underside of flange 151 respectively to effect an oil-tight seal between heat distributor 117 and pylon tube 119.

In at least some alternative forms of this embodiment the function of "O" ring 152 may be served by any suitable ring sealing means.

Thermostat module 121 is seated within the lower portion of pylon tube 119, attached to connector spigot 124. Power is fed via cables or other suitable power conducting means (not shown) down through pylon tube 119 to attach to terminals of thermostat module 121. Power is transmitted through thermostat module 121 to heating coil ends 133. The setting of thermostat module 121 for control of a desired temperature of cooking oil is effected by thermostat control rod 158 extending upwardly from the module through pylon tube 119 to control module 120.

Control module 120 is comprised of an enclosure having a base portion 137 sealably attached to pylon tube 119, a back closure portion 138 and control cap 139. Base portion 137 is attached to upper end of pylon tube 119 by means of adaptor 155. Adaptor 155 includes a lower skirt portion 156, an annular projecting flange portion 157 and an upper externally threaded portion 158. Lower skirt portion 156 is adapted to slide into pylon tube 119 and is affixed to the tube. Preferably pylon tube 119 and adaptor 155 are made of stainless steel.

The components forming control module 120 are preferably injection moulded from a suitable heat resistant polymer. Base portion 137 of control module 120 is provided with aperture 159 adapted to fit over externally threaded portion 158 of adaptor 155 to seat on projecting flange portion 157. On assembly, a threaded securing ring 160 is screwed down onto externally threaded portion 158 to secure base portion 137 to pylon tube 119.

Control module 120 is provided with thermostat control knob 140, rotation of which is transmitted via thermostat control rod 158. Control knob 140 movement is adapted to change the temperature setting in a first direction of rotation and affect the resetting of the thermostat overheat cutout condition when rotated fully in an opposite second direction. Control module 120 is further provided with power on/off switch 141. In this preferred embodiment power on/off switch 141 is integrated with safety switch mechanism 142 such that if heating assembly 116 is not properly located on the rim of its bowl, safety switch mechanism 142 prevents power on/off switch 141 being set to its "on" position.

Figure 8:
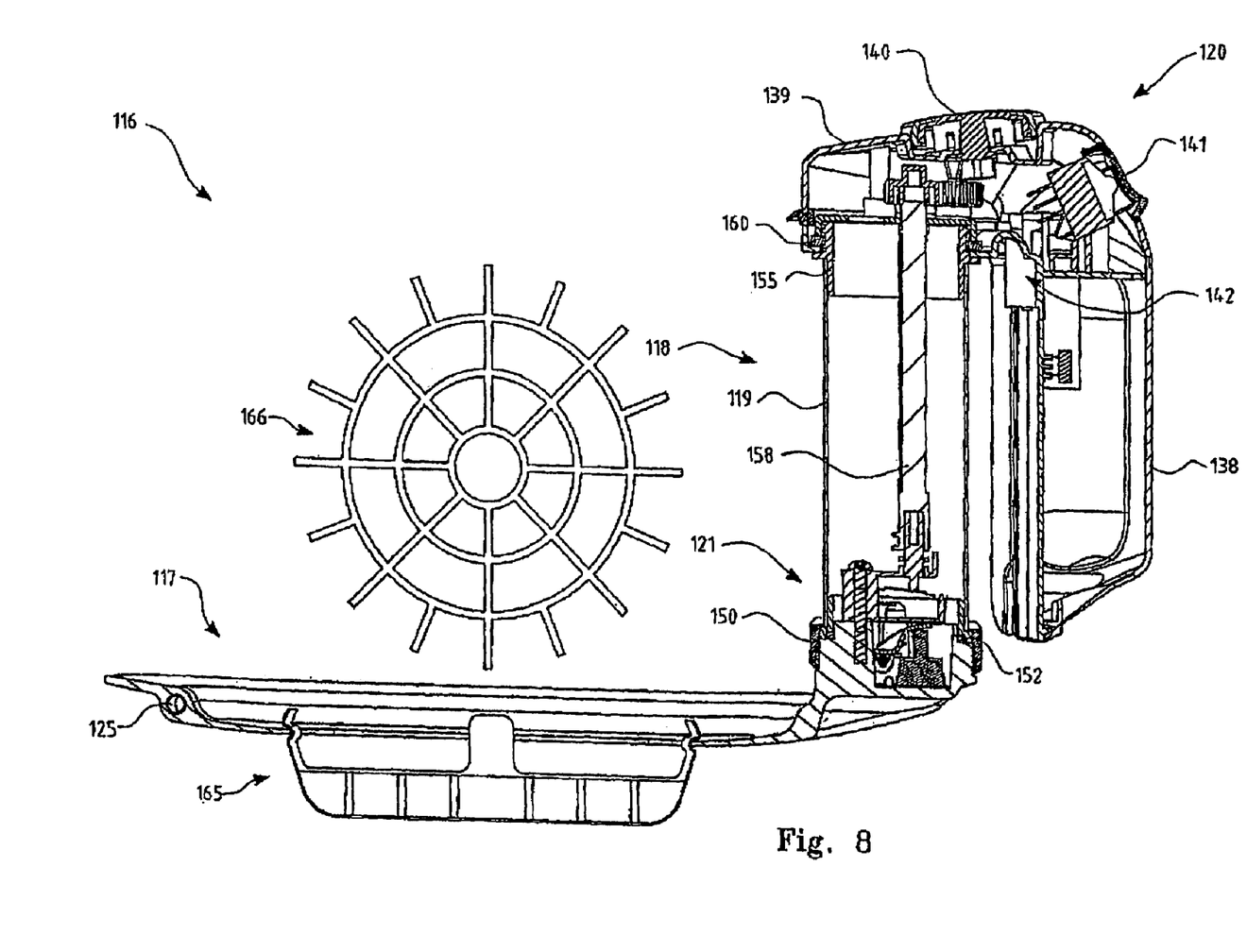
FIG. 8 is a sectioned side view of FIG. 7 when assembled.

In at least one preferred embodiment of the invention as shown in FIG. 8, a sludge strain basket 165 is provided for the prevention of turbulent flow of oil through the central aperture of the heat distributor and for the purpose of trapping particulate carbonate matter. Preferably the basket clips into the internal periphery of the heat distributor so as to be readily removable for cleaning. It is provided in at least some forms with the internal partition grating as shown in plan view in FIG. 8. As an alternative to its retention in the aperture of the heat distributor, basket 165 may be supported or releasably retained at the base of the bowl (not shown in FIG. 8)

Clearly the embodiments described in detail above may be modified by those skilled in the art without departing from the concept and spirit of the invention. Thus for example a variety of bowl and heat distributor shapes may be employed without affecting the function and advantages of the invention.

What is claimed is:

1. An electric deep frying appliance adapted for the heating of cooking oil comprising a bowl and heating assembly; said heating assembly including a heat distributor wherein said heat distributor is in the form of an annular dished member; a central aperture of said annular dished member adapted to allow passage therethrough of contaminants when said appliance is in use; said heating assembly further including a control pylon adapted to provide power and temperature control to said heat distributor.

2. The appliance of claim 1 wherein said bowl is formed of a substantially vertical wall part and a dished base part.

3. The appliance of claim 1 wherein said bowl is formed of mild steel.

4. The appliance of claim 1 wherein said bowl is formed of stainless steel.

5. The appliance of claim 1 wherein said bowl is formed of aluminium.

6. The appliance of claim 1 wherein said bowl is supported in a suitable support structure.

7. The appliance of claim 2 wherein said dished base part is provided with a central depression, said central depression adapted to the accumulation of oil contaminants.

8. The appliance of claim 7 wherein said annular dished member extends substantially between the perimeter of said central depression and the internal surface of said wall part.

9. The appliance of claim 7 wherein said annular dished member is formed of pressure die-cast aluminium.

10. The appliance of claim 7 wherein said annular dished member envelops a heat emitting tubular element.

11. The appliance of claim 7 wherein said annular dished member is thermally connected to a heat emitting tubular element.

12. The appliance of claim 7 wherein said annular dished member is provided with integrally cast support members projecting from the underside of said dished member so as to raise said dished member above the surface of said dished base part of said bowl.

13. The appliance of claim 10 wherein said heat emitting tubular element is in the form of a length of steel tube having an insulated heating coil spring along the axis of said tube; said coil spring connected to terminals at the outer ends of said length of steel tube.

14. The appliance of claim 1 wherein said annular dished member is provided with an integrally die-cast raised pylon connector spigot.

15. The appliance of claim 14 wherein said terminals of said coil spring project upwardly in said connector spigot.

16. The appliance of claim 15 wherein said control pylon comprises a substantially vertical hollow tubular member sealably connected to said connector spigot at the lower end of said tubular member and to a control module at the upper end of said tubular member; said control pylon providing a conduit for power cables and a control rod extending from said control module to a thermostat and power connection module mounted within said lower end of said tubular member.

17. The appliance of claim 16 wherein said tubular member is of a length sufficient to position said control module above the rim of said bowl when said annular dished member of said heat distributor is resting with said support members on said dished base part of said bowl.

18. The appliance of claim 16 wherein said thermostat and power connection module is adapted to mount to said connector spigot within said tubular member.

19. The appliance of claim 16 wherein said thermostat and power connection module includes an adjustable thermostat mechanism, said mechanism provided with a vertically projecting thermostat adjustment shaft.

20. The appliance of claim 16 wherein said thermostat and power connection module includes connector means adapted to provide electrical connection with said terminals of said heating coil spring when said thermostat and power connection module is located on said connector spigot.

* * * * *